United States Patent [19]

Vescial et al.

[11] Patent Number: 4,918,987
[45] Date of Patent: Apr. 24, 1990

[54] LASER ACCELEROMETER

[75] Inventors: Frederick Vescial, Orange; Frederick Aronowitz, Laguna Niguel, both of Calif.

[73] Assignee: Rockwell International Corporation, El Segundo, Calif.

[21] Appl. No.: 144,999

[22] Filed: Jan. 19, 1988

[51] Int. Cl.[5] .............................................. G01P 15/13
[52] U.S. Cl. ............................... 73/517 B; 73/517 R
[58] Field of Search ................ 73/517 B, 517 R, 653; 250/231 R; 356/345

[56] References Cited

U.S. PATENT DOCUMENTS

| 4,598,586 | 7/1986 | Danielson | 73/517 B |
| 4,686,858 | 8/1987 | Muscatell | 73/517 B |

*Primary Examiner*—John Chapman
*Attorney, Agent, or Firm*—H. Fredrick Hamann; George A. Montanye; James F. Kirk

[57] ABSTRACT

A laser accelerometer comprises a frame having three orthogonal input axes and multiple proof masses, each proof mass having a predetermined blanking surface. A flexible beam supports each proof mass. The flexible beam permits movement of the proof mass on the input axis. A laser light source provides a light ray. The laser source is characterized to have a transverse field characteristic having a central null intensity region. A mirror transmits a ray of light to a detector. The detector is positioned to be centered to the light ray and responds to the transmitted light ray intensity to provide an intensity signal. The intensity signal is characterized to have a magnitude related to the intensity of the transmitted light ray. The proof mass blanking surface is centrally positioned within and normal to the light ray null intensity region to provide increased blanking of the light ray in response to transverse movement of the mass on the input axis. The proof mass deflects the flexible beam and moves the blanking surface in a direction transverse to the light ray to partially blank the light beam in response to acceleration in the direction of the input axis. A control responds to the intensity signal to apply a restoring force to restore the proof mass to a central position and provides an output signal proportional to the restoring force.

12 Claims, 11 Drawing Sheets

LASER ACCELEROMETER

BACKGROUND OF THE INVENTION

1. Field of the Invention

The present invention relates to the field of accelerometers and more particularly to the field of optical accelerometers or laser accelerometers having a pendulous mass that is force rebalanced or restored in response to an acceleration sensed on the accelerometer's input axis.

2. Description of The Prior Art

Electronically rebalanced or restored accelerometers that rely on Hooke's Law are known.

A laser accelerometer is shown in U.S. Pat. No. 4,048,859 to Gary D. Babcock and entitled "Laser Accelerometer" and assigned to Rockwell International Corporation. The Babcock accelerometer is a single axis accelerometer that does not utilize an electronically restored or rebalanced pendulous mass. In the Babcock instrument, means are provided to assure that two orthogonally polarized modes are excited in a gas laser cavity. A birefringent element contained in the cavity is traversed by light in both modes. A proof mass attached to the birefringent element applies stress to it in response to acceleration along one particular axis. The material index of refraction change produced by the acceleration-induced stress is different for the two orthogonally polarized lasing modes, resulting in a change in the frequency difference between them. This frequency difference is measured and translated into sensed acceleration. The Babcock instrument is not a clear path instrument. In the Babcock instrument, the sensing element is inserted into the laser cavity and positioned in the laser beam where the element produces a cavity loss which results in increased energy consumption lessening the efficiency and accuracy of the instrument.

U.S. Pat. No. 4,637,255 issued Jan. 20, 1987 to Graham J. Martin and assigned to Litton Systems Inc. shows an out of plane ring laser gyro cavity having a proof mass positioned atop the instrument. The cavity in the housing accommodates a laser gain medium. Mirrors are used within the cavity to direct light in a non-planar ring around the cavity. As the proof mass is acted on by acceleration along a preselected sensitive axis, it transfers a force to the cavity structure thereby slightly deforming the cavity. Deformation of the cavity in response to an acceleration input results in a change in the frequency splitting between the two modes of different polarization within the cavity. The frequency splitting is measured and related to sensed acceleration.

The Martin instrument is a clear path instrument. The Martin instrument is a single axis instrument and cannot be adapted to sense acceleration on three separate and orthogonal axes.

Use of synchronous demodulation in connection with extracting signal information from the Martin and Babcock instruments is not taught or suggested in either reference.

SUMMARY OF THE INVENTION

The subject invention combines the features of a force-rebalanced instrument with a laser pickoff. In addition, the subject invention is a clear path instrument having the capability of sensing acceleration on 1, 2 or 3 orthogonal axes.

The subject invention has a frame with identified orthogonal (x), (y), and (z) axes. A sensor and proof mass is required for each sensitive axis. A flexible beam supports each proof mass and is referenced to the frame or housing which is typically fabricated from a low-expansion glass ceramic material such as ZERODUR.

A laser light source is formed within the cavity. Each proof mass has an identified blanking region. Each blanking region is centrally positioned in the light beam on axis, the blanking surface being located at a point in the beam where the light intensity is near zero for the operating mode selected for the laser. A partially transmissive mirror permits a small percentage of the light to leave the cavity. A detector means detects the transmitted light and provides a signal to a lockin amplifier. The lockin amplifier delivers a signal to electronically restore the proof mass so as to maintain the blanking surface at a point in the light beam to maintain transmitted light intensity at a peak. The drive signal supplied to restore the proof mass represents the acceleration being experienced by the proof mass and is the output signal of the accelerometer. A separate lockin amplifier is used for each sensitive axis. Each lockin amplifier operates with a modulating frequency that is unique to that channel and is not an integral multiple of any of the other frequencies.

BRIEF DESCRIPTION OF THE DRAWINGS

FIG. 4a is a schematic representation of the transverse intensity pattern for a laser operating in the TEM10 mode.

FIG. 4b is the transverse intensity pattern for a laser operating in the TEM11 mode.

DESCRIPTION OF THE PREFERRED EMBODIMENTS

Figure 1:
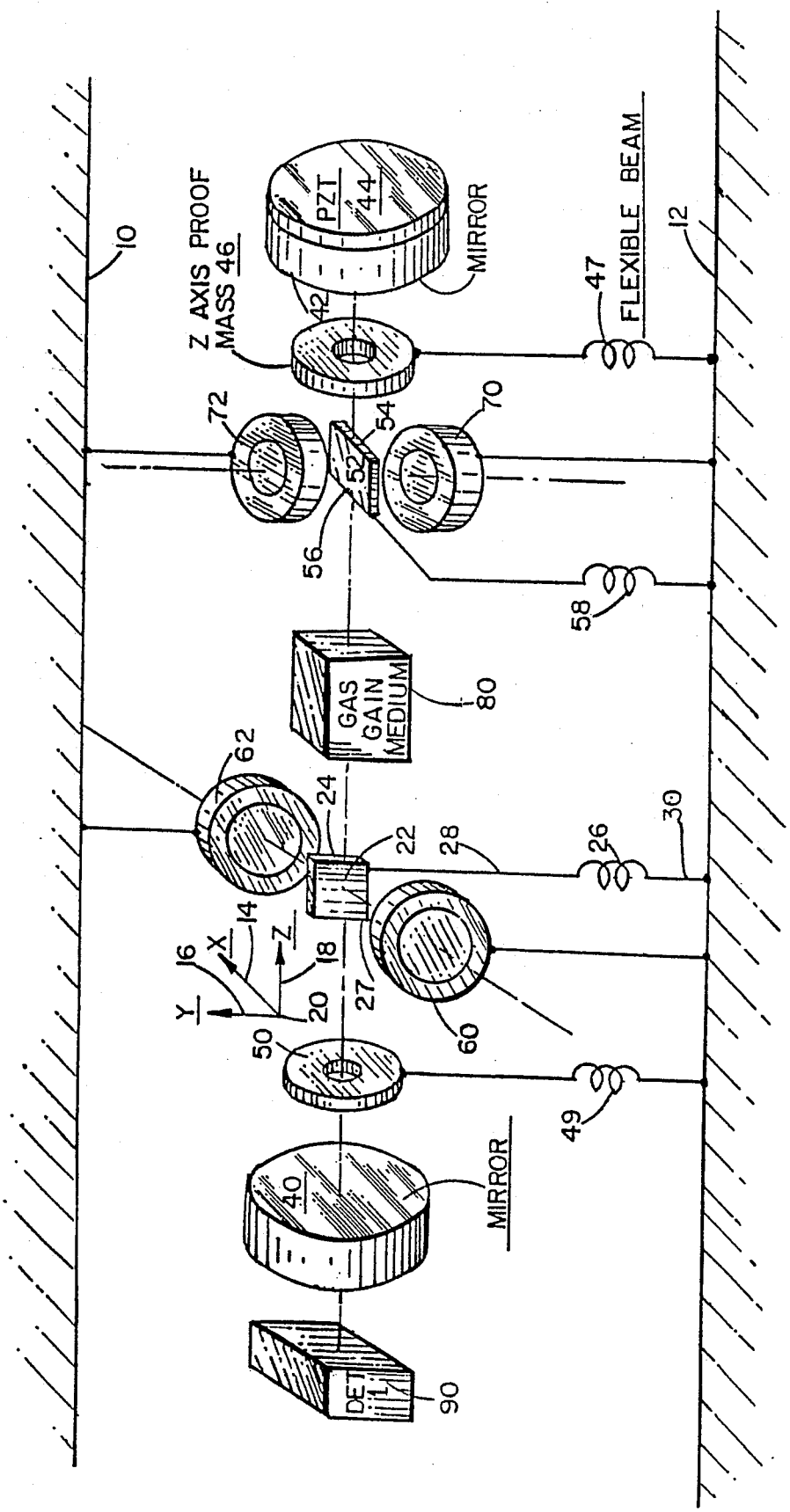
FIG. 1 is a schematic perspective view of the invention laser accelerometer.

FIG. 1 shows the principal elements of the invention laser accelerometer depicted in a schematic perspective view. The detector means and control electronics are shown on subsequent drawings.

The laser accelerometer comprises a frame 12 having an input axis such as the input axis (x), 14 a cross axis (y), 16 orthogonal to and co-planar with the input axis and a longitudinal axis such as the (z) axis 18 passing through the intersection of the (x) and (y) axes. The (z) axis is orthogonal to the plane of the (x) and (y) axes. Block 22 represents an (x) axis proof mass having a first blanking surface, such as surface 24. Since light within the cavity moves in both directions, surface 27 represents a second blanking surface. Coil shaped element 26 is a schematic representation of a flexible beam or flexure having a first end 28 coupled to the (x) axis proof mass and a second end 30 coupled to the frame 12. The deflection of the flexure 26 permits a predetermined range of movement of the (x) axis proof mass 22 in response to sensed acceleration along the (x) input axis of the frame 12.

Figure 2:
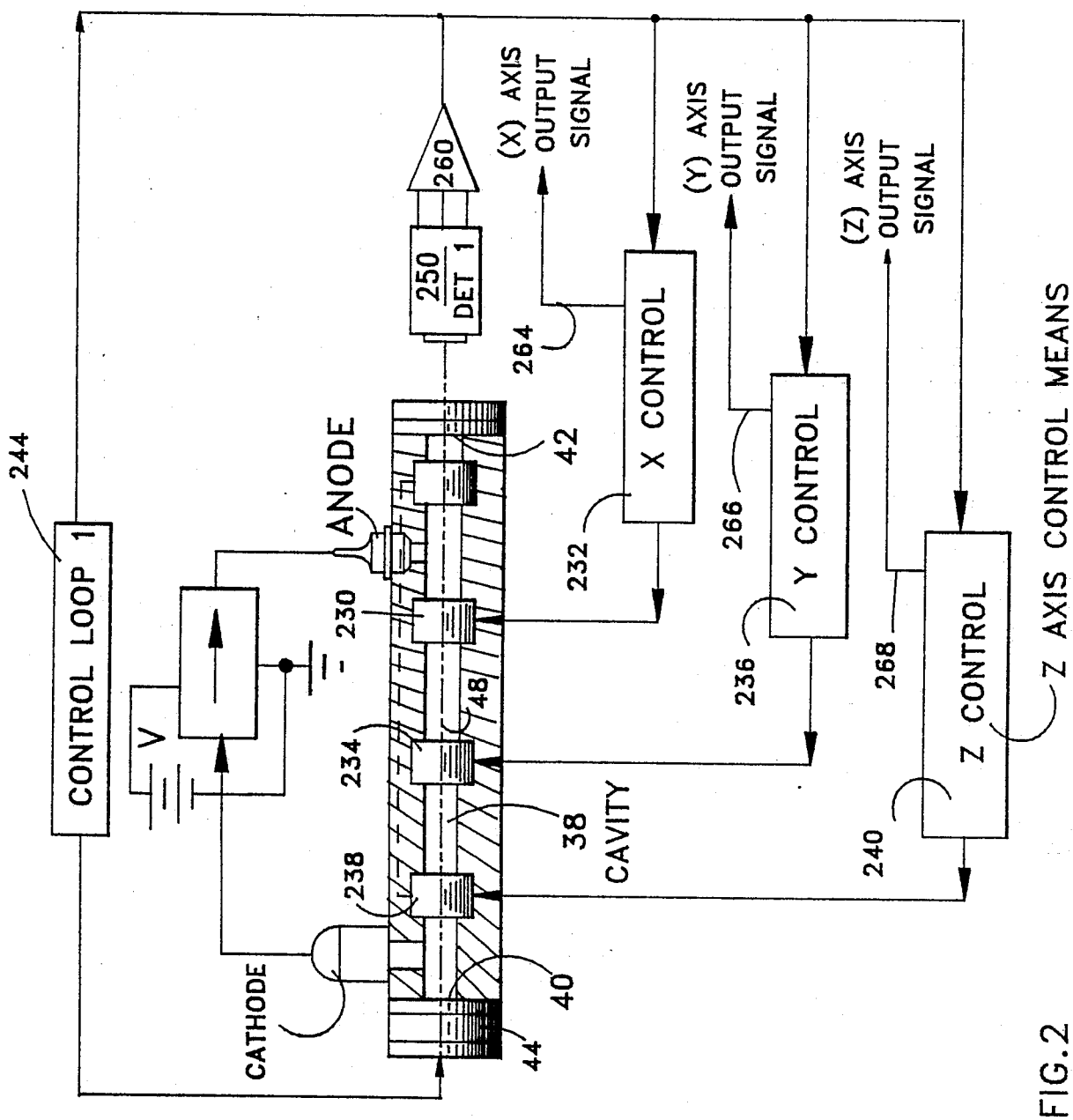
FIG. 2 is a block diagram of a straight linear laser accelerometer.

Referring to FIGS. 1 and 2, cavity 38 contains a laser gain medium 80 for providing a light ray coaxially aligned with the (z) axis when end mirrors 40 and 42 are aligned. The cavity is typically fabricated from a homogeneous material having a low coefficient of thermal expansion such as a ZERODUR. The laser has a transverse electromagnetic field characteristic having a null intensity region centered on the (z) axis. The laser is adjusted to operate in the TEM10 mode with only one axis proof mass, such as block 22 present. With (x) and (y) or (x), (y), and (z) proof masses present the laser is adjusted to operate in the TEM11 mode. In both cases, the operating modes are the lowest order modes of the laser with negligible loss.

Block 250 represents a detector means having at least a first detector on a sensitive plane. The detector means typically has a reversed biased PIN diode and a low noise preamplifier. A detector such as the SD-0-12-12-231 manufactured by the Silicon Detector Corporation of Newbury Park, CA is suitable for use with a Helium Neon laser source such as that contemplated for use in this Preferred Embodiment.

The sensitive plane is normal to the (z) axis. The detector means 250 is positioned to be centered to the light ray 48 and responsive to the light ray intensity for providing an intensity signal.

Block 260 represents respective bias and amplifier means coupled to the detector means 250 for providing a bias current to the first detector and for amplifying the intensity signal developed by the detector means in response to incident light from the light ray 48. The intensity signal is characterized to have a magnitude related to the intensity of the light ray incident on the detector means.

Referring again to FIG. 1, The blanking surfaces are centrally positioned within and normal to the light ray 48. The blanking surfaces 24, 27 are centrally positioned in the laser light beam null intensity region to provide increased blanking of the light ray in response to transverse movement of the mass on the input axis, i.e. along the (x) axis. Proof mass 22 deflects the flexible beam 26 and moves the blanking surfaces 24, 27 in direction transverse to the light ray 48 to partially blank the light ray in response to acceleration in the direction of the input axis (x) 14.

Figure 4:
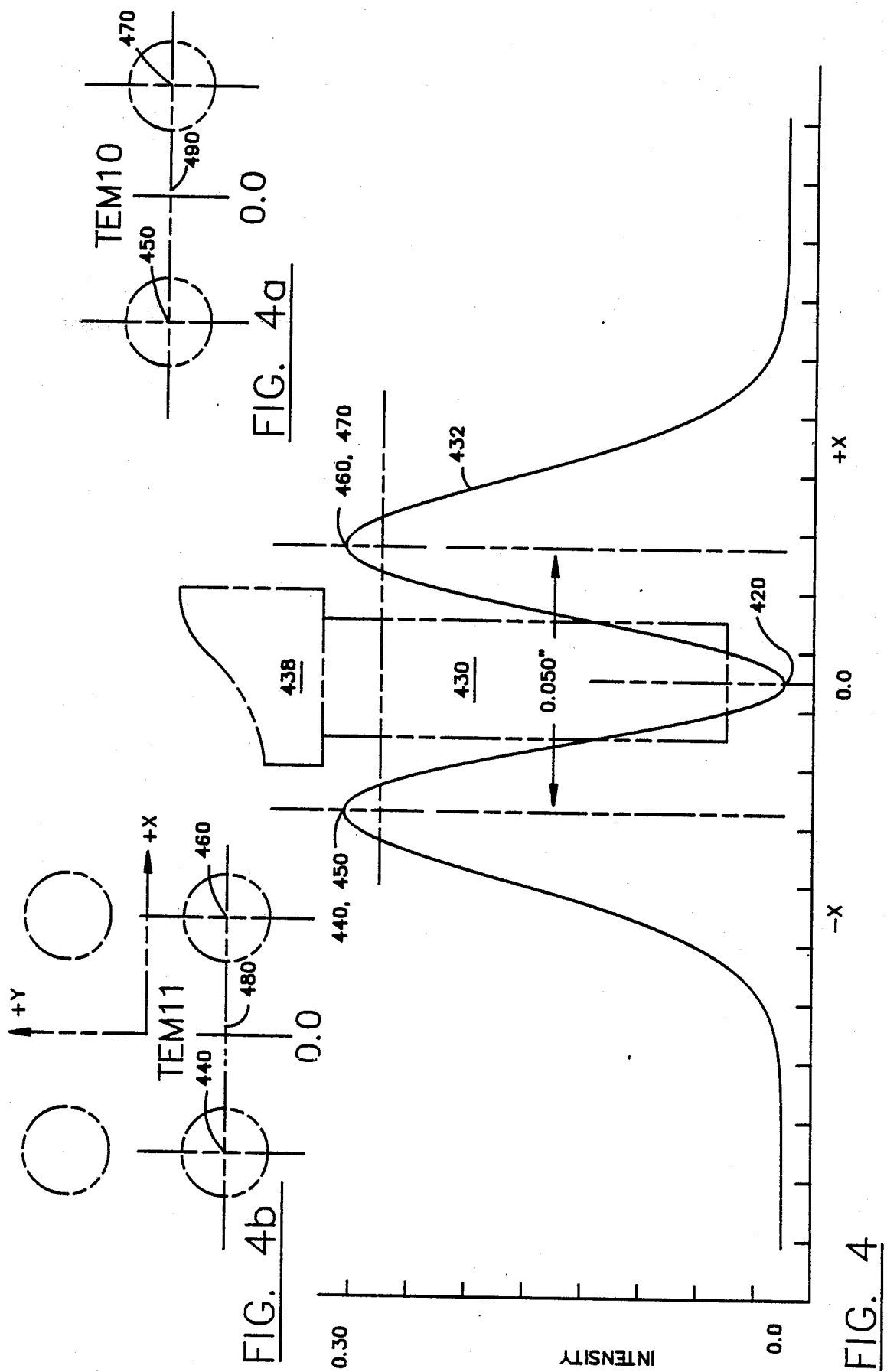
FIG. 4 is a graph of the light intensity of two adjacent lobes along line 490 in FIG. 4a or along line 480 in FIG. 4b.

FIG. 4 is a graphical depiction of the relative intensity of light beam 48 as a function of transverse distance from the center axis, i.e. the center of light ray 48. FIG. 4a shows the two intensity lobes of the TEM10 mode in the transverse x-y plane normal to light ray 48. FIG. 4b shows the four intensity lobes of the TEM11 mode in the transverse x-y plane normal to light ray 48. FIG. 4 is a graph of the relative light intensity of two adjacent lobes along line 490 in FIG. 4a or along line 480 in FIG. 4b. The distance between the two lobes of the intensity pattern is approximately 0.050 in. The phantom block 430 represents a blanking surface such as the first or second blanking surface 24, 27 positioned in the light beam 48.

Referring again to FIG. 2, block 230 represents the schematic depiction of permanent magnets 60, 62 shown in FIG. 1 along with restoring coils to be attached to (x) axis proof mass 22 to be shown and described in connection with FIG. 5 and FIG. 6. Block 232 represents the control means electronics required to provide drive signals to the elements within block 230 to complete the control loop for restoring the (x) axis proof mass 22 to its central or rest position. The control means 232 is responsive to the intensity signal via signal line 262 for applying an (x) axis restoring force to restore the (x) axis proof mass 22 to the central position and for providing an (x) axis output signal proportional to the restoring force.

Figure 5:
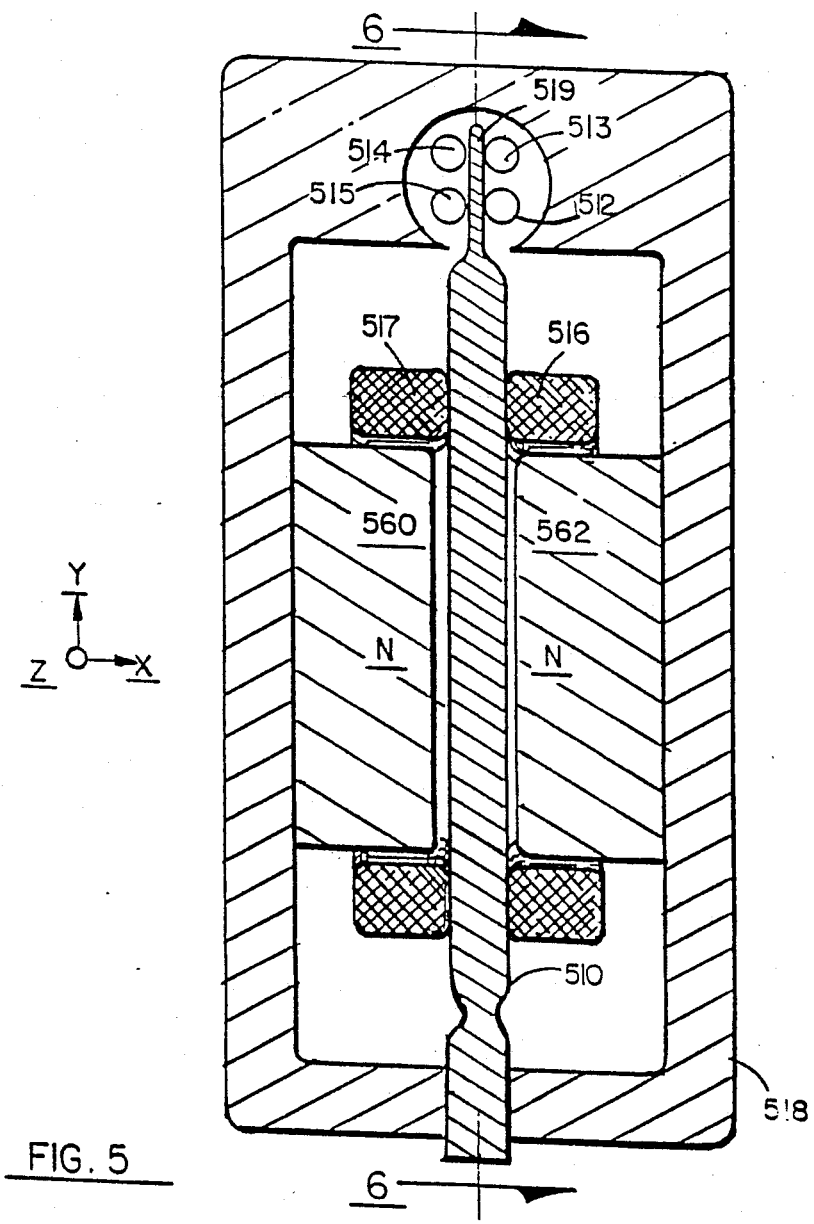
FIG. 5 is a side sectional view of a pendulous proof mass and restoring coils for operation with a TEM11 mode beam.

FIG. 5 is a sectional view of a pendulous proof mass 510 and restoring coils 516, 517 for operation with a TEM11 mode beam represented as having four intensity lobes, 512, 513, 514, and 515 separated on a line passing through their center of low intensity by predetermined blanking surface 519. The restoring coils 516, 517 are attached to the proof mass 510. Blocks 560 and 562 represent opposing permanent magnets for producing a field. Control current passing through coils 516 and 517 interacts with the fields produced by permanent magnets 560, 562 to restore the proof mass to a position of equilibrium by applying force to it along the (x) direction.

Figure 6:
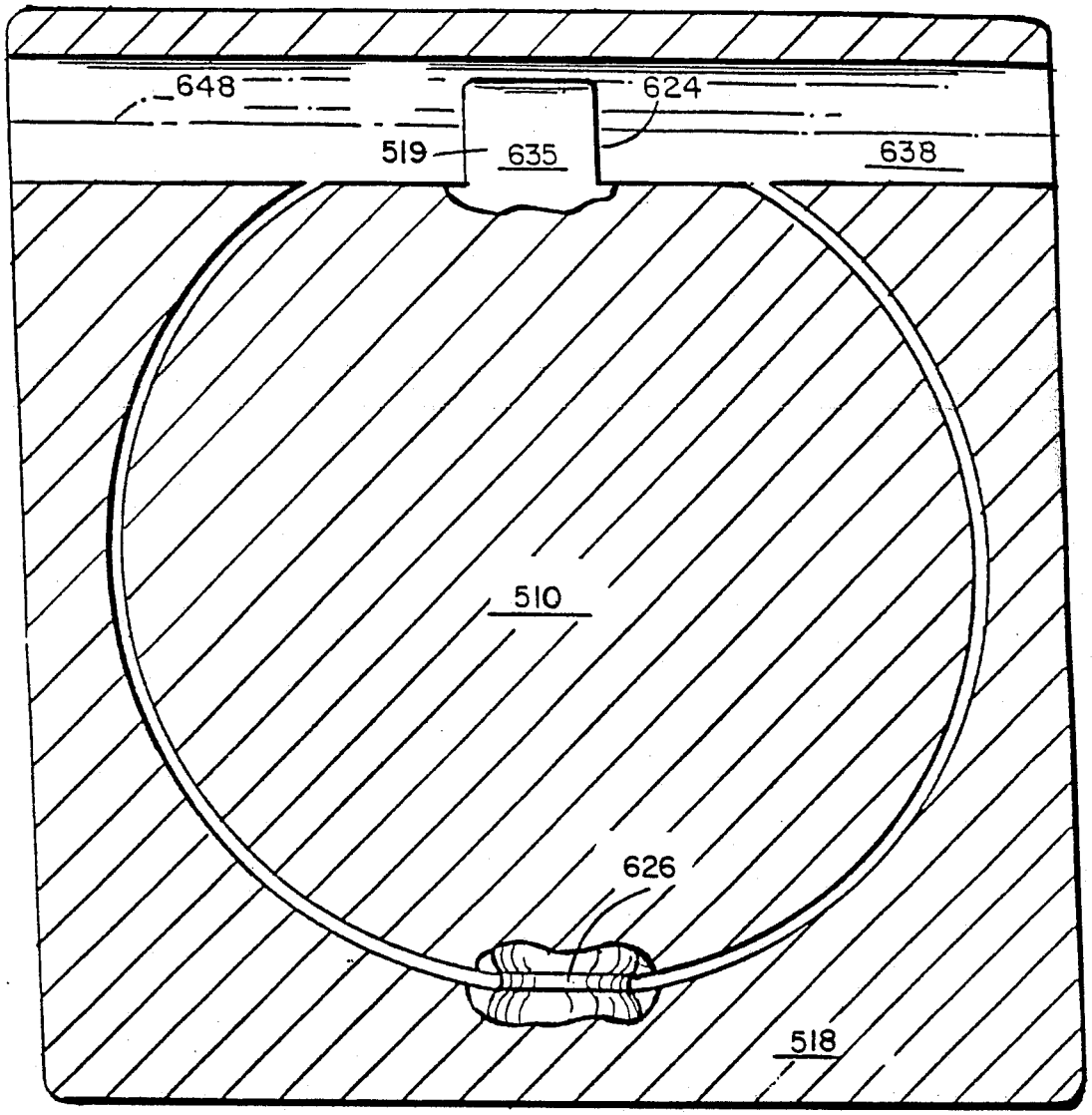
FIG. 6 is a sectional view of the pendulous proof mass of FIG. 5 taken along line 6—6.

FIG. 6 is a sectional view of the proof mass 510 and housing, or frame 518 of FIG. 5 taken along line 6—6. shown in FIG. 5. Proof mass 510 is supported by a flexible beam such as flexure 626 which is coupled to frame 518. The tab 635 is inserted into cavity 638. The tab or extension of the proof mass 510 has blanking surface 624, 627 positioned within and normal to the null intensity region of light ray 648 to provide increased blanking of the light ray 648 in response to transverse movement, i.e. movement in or out of the page of the mass 510. As shown, the sensitive axis for the proof mass 510 would be directly into or directly out of the plane of the sectional view.

The proof mass arrangement of FIGS. 5 and 6 are reorientated to position the plane of the sectioned proof mass 510 to be normal to the (y)axis for sensing sensitivity on the (y) axis.

FIG. 1 shows block 52 representing a (y) axis proof mass having a first and second blanking surface 54, 56. The (y) axis proof mass is supported by a flexure or flexible beam represented by spring 58 having a first end coupled to the (y) axis proofmass 52 and a second end coupled to the frame 12. The deflection of the flexible beam 58 permits a predetermined range of movement of the (y) axis proof mass 52 in response to sensed acceleration along the (y) input axis of the frame 12.

The first (y) axis proof mass blanking surface 54 is centrally positioned within and normal to the light ray null intensity region to provide increased blanking of the light ray in response to transverse movement of the (y) axis proof mass 52 on the cross or (y) input axis. The (y) axis proof mass 52 moves vertically to deflect the flexible beam 58. Deflecting the flexure or flexible beam 58 moves the blanking surface 54 in a direction transverse to the light ray to partially blank the light beam in response to acceleration in the direction of the cross input axis (y).

Referring again to FIG. 2, block 234 represents the schematic depiction of permanent magnets 70, 72 shown in FIG. 1 along with restoring coils to be attached to (y) axis proof mass 52 also to be shown and described in connection with FIG. 5 and FIG. 6. Block 236 in FIG. 2 represents the control means electronics required to provide drive signals to the elements within block 234 to complete the control loop for restoring the (y) axis proof mass 52 to its central or rest position. The control means 236 is also responsive to the intensity signal via signal line 262 for applying a (y) axis restoring force to restore the (y) axis proof mass 52 to the central position and for providing an (y) axis output signal proportional to the restoring force.

Figure 3:
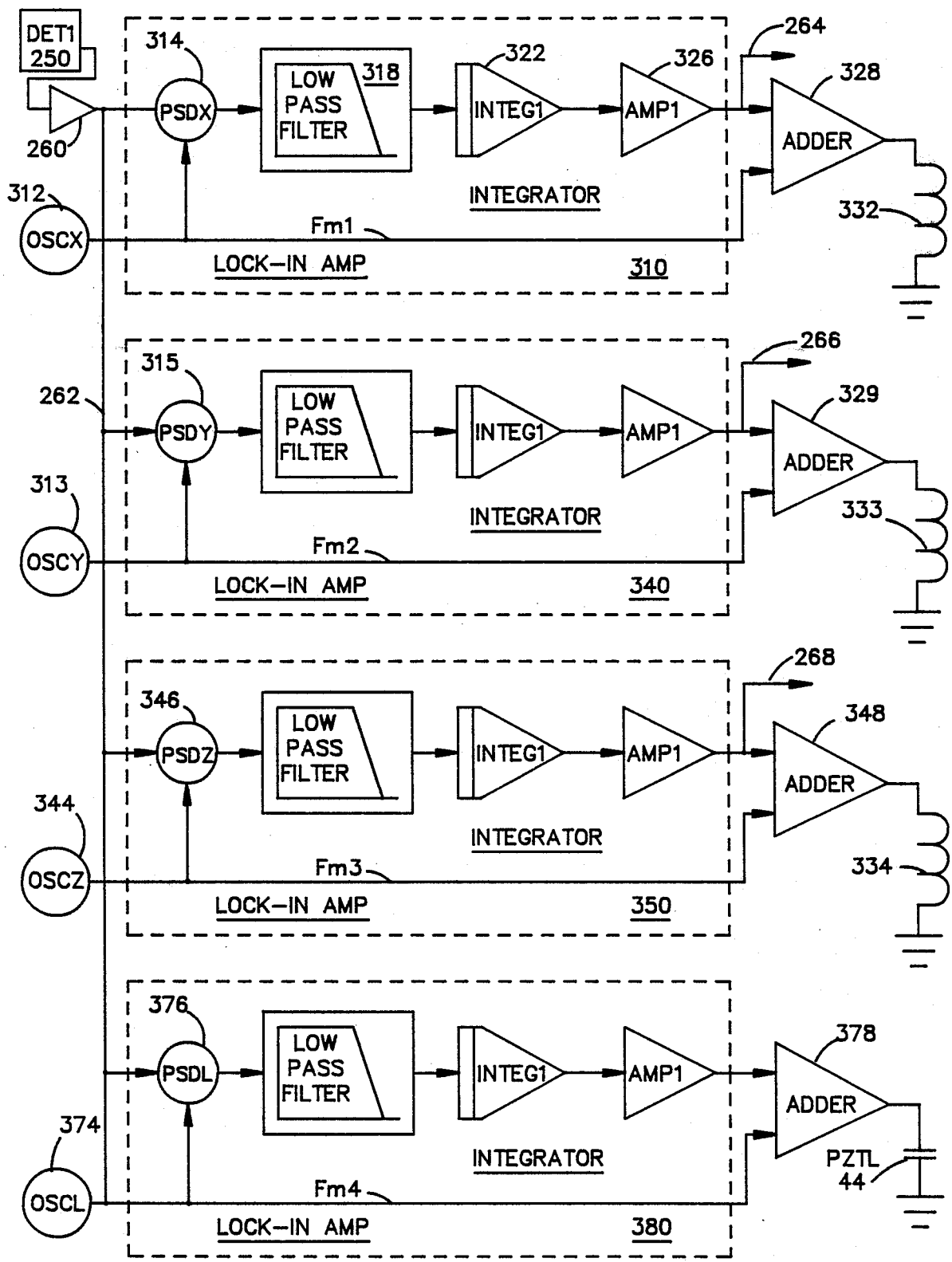
FIG. 3 is a block diagram of the three axis control loops and a path length control loop.

FIG. 3 shows a block diagram of the control means for each control loop in a three-axis accelerometer. Each control means is responsive to the intensity signal from detector 1, 250 via low noise amplifier 260 and signal line 262 for applying a restoring force.

More particularly, the elements within phantom block 310 represent an (x) axis control means for restoring the (x) axis proof mass to its central position. The (x) axis control means 310 provides an (x) axis output signal via signal line 264 proportional to the restoring force.

The (x) axis control means 310 has a first oscillator 312 operating at a first modulating frequency fm1 that provides a first oscillator signal to PSDX (phase sensitive detector) 314 and to ADDER 328.

The blocks within phantom block 310 represent an (x) axis lockin amplifier, such as a PRINCETON APPLIED RESEARCH, MODEL 124, manufactured at Princeton, N.J. The lockin amplifier is used to synchronously demodulate a signal containing one or more signals and to extract and provide a discriminate resulting signal at the reference signal frequency responsive to the first modulating signal fm1 and to the intensity signal for providing an (x) axis restoring signal to restoring coil 332. The PSDX 314 represent a phase sensitive detector which receives an intensity signal from DET1 250 via AMPLIFIER 260. The PSDX 314 is excited by REFERENCE OSCILLATOR OSCX 312 and provides a net positive or negative detected signal depending on the polarity of the acceleration sensed. The LOW PASS FILTER 318 removes noise from the detected signal and provides a filtered and polarized error signal to the input of integrator INTEG1, 322. AMP1, 326 amplifies and buffers the integrated error signal and provides the integrated error signal to the input of ADDER 328 and outputs the integrated error signal as a non-dithered restoring signal on signal line 264.

Fm1, Fm2, Fm3 and Fm4 each represent reference signals from respective REFERENCE OSCILLATORS 312, 313, 344, and 374. Each reference signal operates at a frequency different from the other reference frequencies to permit their respective phase-sensitive detectors to selectively distinguish the composite detected signal from AMPLIFIER 260.

ADDER 328 is responsive to first modulating signal fm1 to form a modulation means responsive to the (x) axis restoring signal and to the first oscillator signal for modulating the (x) axis restoring signal to restoring coil 332. "Restoring coils 332, 333 and 334 represent coils similar to coils 516, 517 described previously and shown on FIG. 5.

The elements within phantom block 340 represent a (y) axis control means for restoring the (y) axis proof mass to its central position. The (y) axis control means 340 provides a (y) axis output signal via signal line 266 proportional to the restoring force.

The (y) axis control means 340 has a second oscillator 313 operating at a second modulating frequency fm2 that provides a second oscillator signal to PSDY (phase sensitive detector) 315 and to ADDER 329.

The blocks within phantom block 340 represent a (y) axis lockin amplifier responsive to the second modulating signal fm2 and to the intensity signal for providing a (y) axis restoring signal to restoring coil 333. Operation of the (y) axis control means lockin AMP 340, the (z) lockin AMP 350, and the length control lockin AMP 380 is similar to that described above for the (x) axis lockin amplifier 310.

ADDER 329 is responsive to second modulating signal fm2 to form a modulation means responsive to the (y) axis restoring signal on signal line 266 and to the second oscillator signal for modulating the (y) axis restoring signal to restoring coil 333.

Figure 7:
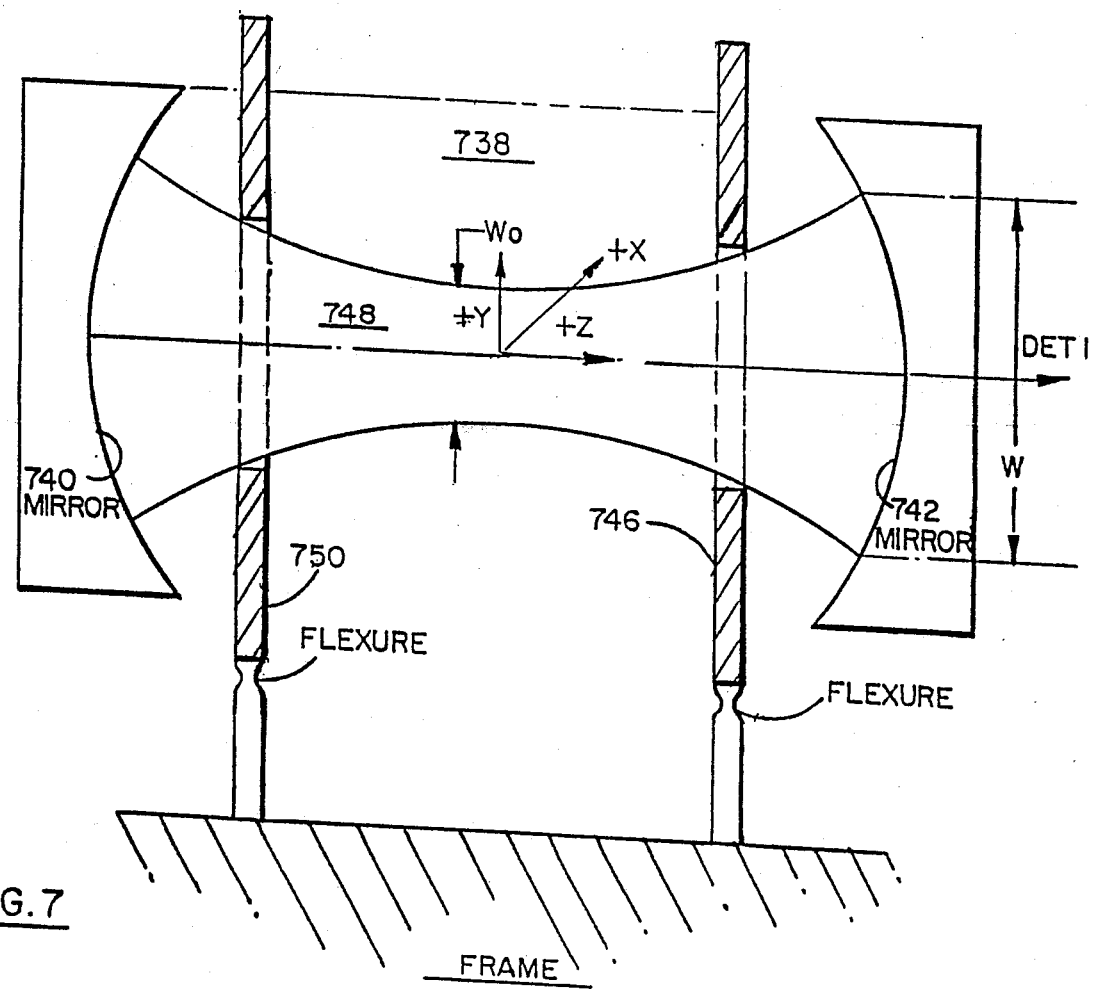
FIG. 7 is a schematic depiction of a longitudinal section of the laser beam showing a pair of longitudinal pendulous mass elements depicted in section.

Referring again to FIG. 2, block 240 represents the restoring means for (z) axis proof mass within block 238. The straight linear laser of FIG. 2 uses a (z) axis proof mass such as those depicted as rings 46, 50 in FIG. 1. Referring to FIG. 1, (z) axis proof mass 46 deflects flexible beam 47 to the right in response to acceleration in the negative z direction. Restoring magnets are omitted from this schematic drawing; however, the invention contemplates a restoring means for restoring each of the (z) axis proof masses 46 and 50. FIG. 7 schematically represents cavity 738 containing beam 748 having a circular cross-section. The beam has its smallest transverse dimension (or waist) Wo at its center, the beam having a maximum diameter W at its ends for mirrors of equal radius. FIG. 7 also shows (z) axis proof masses 750, 746 in a schematic side sectional view in positions of equilibrium. FIG. 7 illustrates that a deflection of a mass such as 750 toward the respective mirror 740 operates to increase cavity losses thereby reducing output power to DET1. A reduction in output power results in a reduction in the amount of light sensed by the detector means DET1.

Light ray 748 is coaxial with the (z) axis of the characterized instrument. As shown in FIG. 7, proof mass 750 deflects to the left in response to acceleration of the housing to the right or in the +(z) direction. Proof mass 746 also deflects to the left in response to acceleration of the housing in the +(z) direction. Proof mass 750 increases the cavity loss in response to acceleration of the cavity in the +(z) direction. Proof mass 746 moves to the left but does not increase or decrease cavity losses significantly in response to acceleration in the +(z) direction. Each of the foregoing response characteristics of proof mass 750 become the response characteristics of proof mass 746, and vice versa in response to cavity acceleration to the left or in the −(z) direction.

Figure 8:
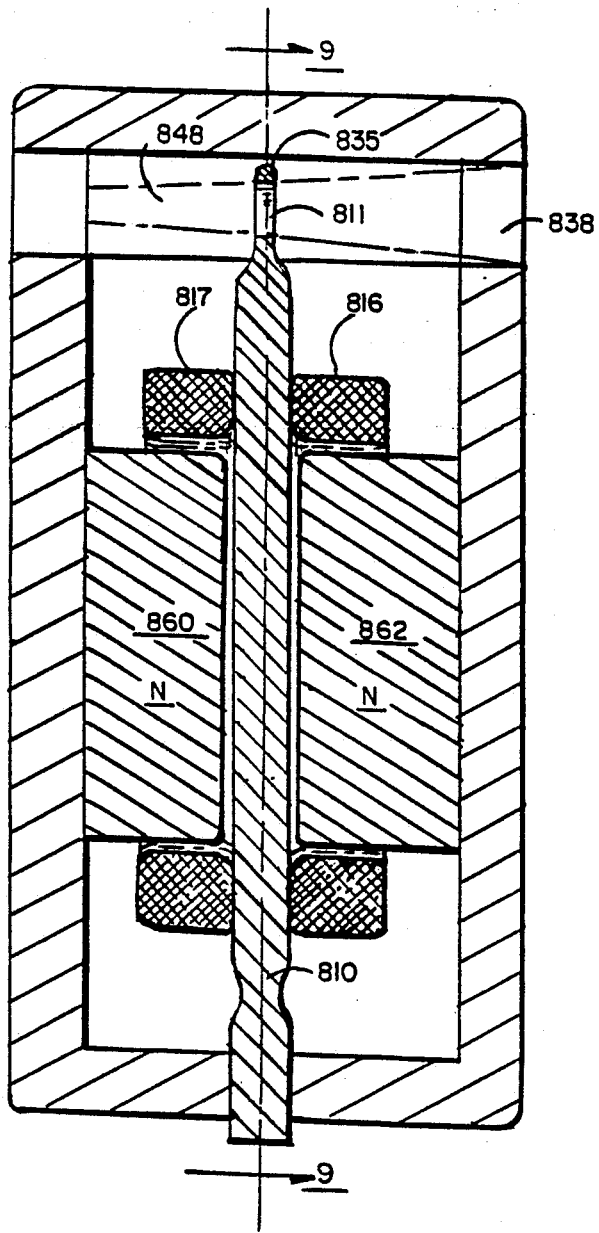
FIG. 8 is a side sectional view of the pendulous proof mass and restoring coils for a (z) axis acceleration sensor.

FIG. 8 shows pendulous mass 810 in side sectional view positioned between permanent magnets 860 and 862. Coils 816 and 817 are attached to pendulous mass 810. Control current is passed through coils 816, 817 to interact with the field produced by permanent magnets 860, 862 to produce a restoring force for pendulous mass 810. The control currents for coils 816, 817 are provided by the (z) axis control loop.

The pendulous mass of FIG. 8 is one of two used to sense both positive and negative acceleration on the (z) axis. The region at the top of the drawing shown as reference number 838 represents the (z) axis cavity. Tab 835 on pendulous mass 810 has aperture 811. Light ray 848 passes through aperture 811 and expands as it proceeds from left to right to a mirror (not shown).

Figure 9:
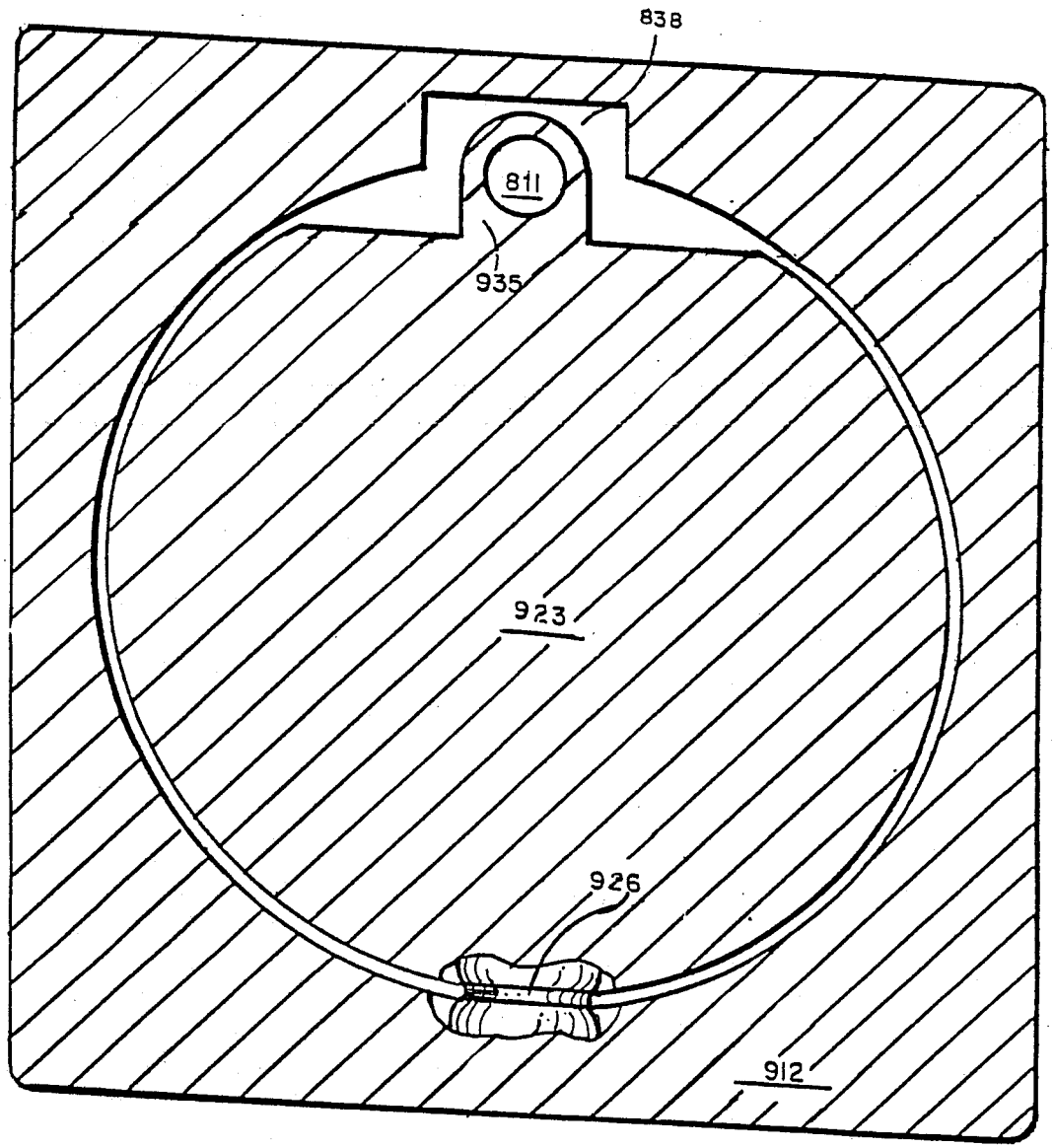
FIG. 9 is a sectional view of the pendulous proof mass of FIG. 8 taken along line 8—8.

FIG. 9 depicts a sectional view 922 of the proof mass 810. 935 represents a sectional view of tab 835 having aperture 811 at the center of the tab. The light ray 848 passes through aperture 811 and is not shown. The (z) axis cavity is represented by region 838. The pendulous mass 923 is supported by a flexible beam such as flexure 926 coupled to frame shown in section as region 912.

It should be appreciated that use of an apertured sensor such as described in connection with FIGS. 1, 7, 8, and 9 restricts operation of the laser beam as it passes through the aperture to the lowest order mode. The aperture restricts the spacial extent of the beam. Proof masses having predetermined blanking surfaces are positioned at low intensity regions of the beam and force the laser to operate in the TEM10 or the TEM11 mode, depending on whether one or two pendulous masses having a predetermined blanking surface are used. An apertured pendulous mass operating in cooperation with one or two pendulous masses having predetermined blanking surfaces will restrict the laser to operate in one of these two lowest order modes depending upon the number of sensitive axes that the accelerometer is equipped to monitor.

It is expected that use of a ring shaped mass, such as 750, 746 will have substantially lower sensitivity than use of the slab style shown in connection with the (x) axis proof mass 22.

Referring to FIG. 2, elements within block 240 represent a (z) axis control means for restoring the (z) axis proof mass within block 238 to its central position. The (z) axis control means 240 provides a (z) axis output signal via signal line 268 proportional to the restoring force.

FIG. 3 depicts the (z) axis control means within phantom block 350. The (z) axis control means has a first oscillator OSCZ 344 operating at a third modulating frequency fm3 that provides a third oscillator signal to PSDZ (phase sensitive detector) 346 and to ADDER 348.

The blocks within phantom block 350 represent a (z) axis lockin amplifier responsive to the third modulating signal fm3 and to the intensity signal for providing a (z) axis restoring signal to restoring coil 334.

ADDER 348 is responsive to third modulating signal fm3 to form a modulation means responsive to the (z) axis restoring signal and to the third oscillator signal for modulating the (z) axis restoring signal to restoring coil 334.

Referring to FIG. 3, phantom block 380 represents a lockin amplifier for peak tuning the output of the linear laser. Phantom block represents a path length control means for continuously adjusting the path length of the laser to maintain operation in the TEM10 or TEM11 modes, respectively, at peak power. The path length control means has a fourth oscillator OSCL 374 operating at a fourth modulating frequency fm4 that provides a fourth oscillator signal to PSDL 376 and to ADDER 378.

The blocks within phantom block 380 represent an intensity lockin amplifier responsive to the fourth modulating signal fm4 and to the intensity signal via signal line 262 for providing a tuning signal to PZTL 44.

The ADDER 378 is responsive to the fourth modulating signal fm4 for modulating the intensity of the laser beam. PZTL 44 represents a piezoelectric transducer for controlling and tuning the optical path length of the optical cavity.

Figure 10:
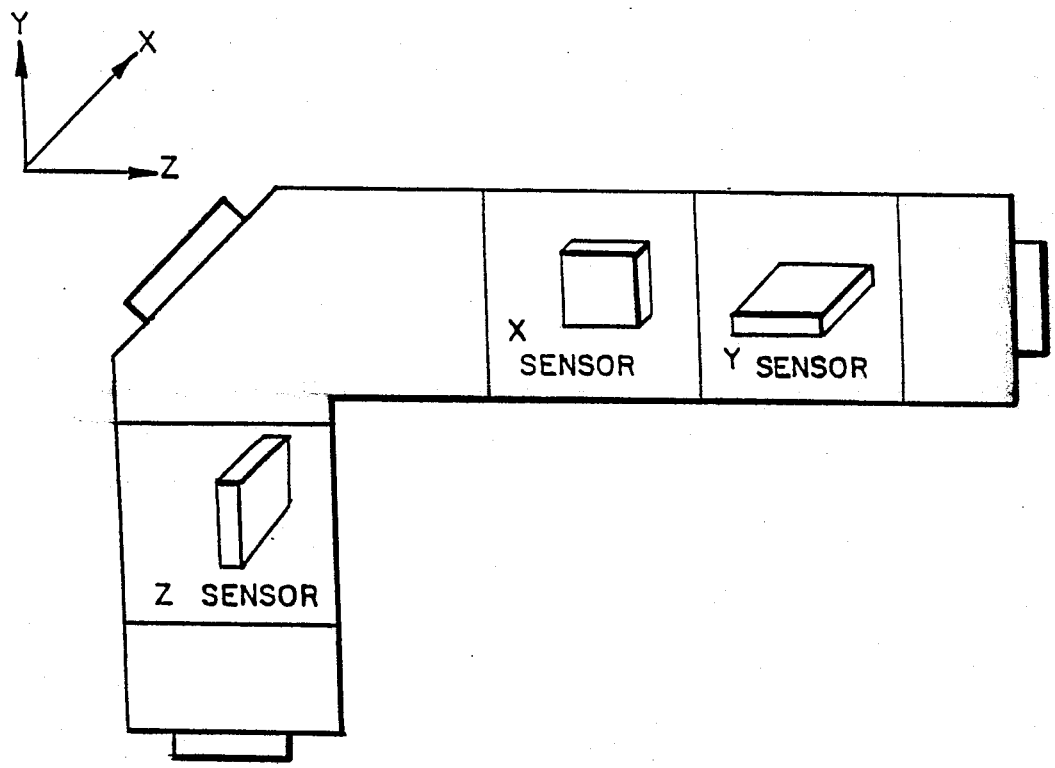
FIG. 10 is a block diagram of an "L" shaped laser accelerometer characterizing the location of pendulous mass sensors for three axis acceleration sensing.

FIG. 10 is a block diagram of an alternative embodiment of the invention laser accelerometer having three sensitive axes, each axis having high sensitivity. Each of the sensitive axes uses a proof mass having a predetermined blanking surface such as characterized in connection with the earlier discussion relating to FIGS. 5 and 6. FIG. 10 shows the corresponding relationships between the position of the pendulous mass elements and the respective sensitive axes for the (x), (y), and (z) axes.

Figure 11:
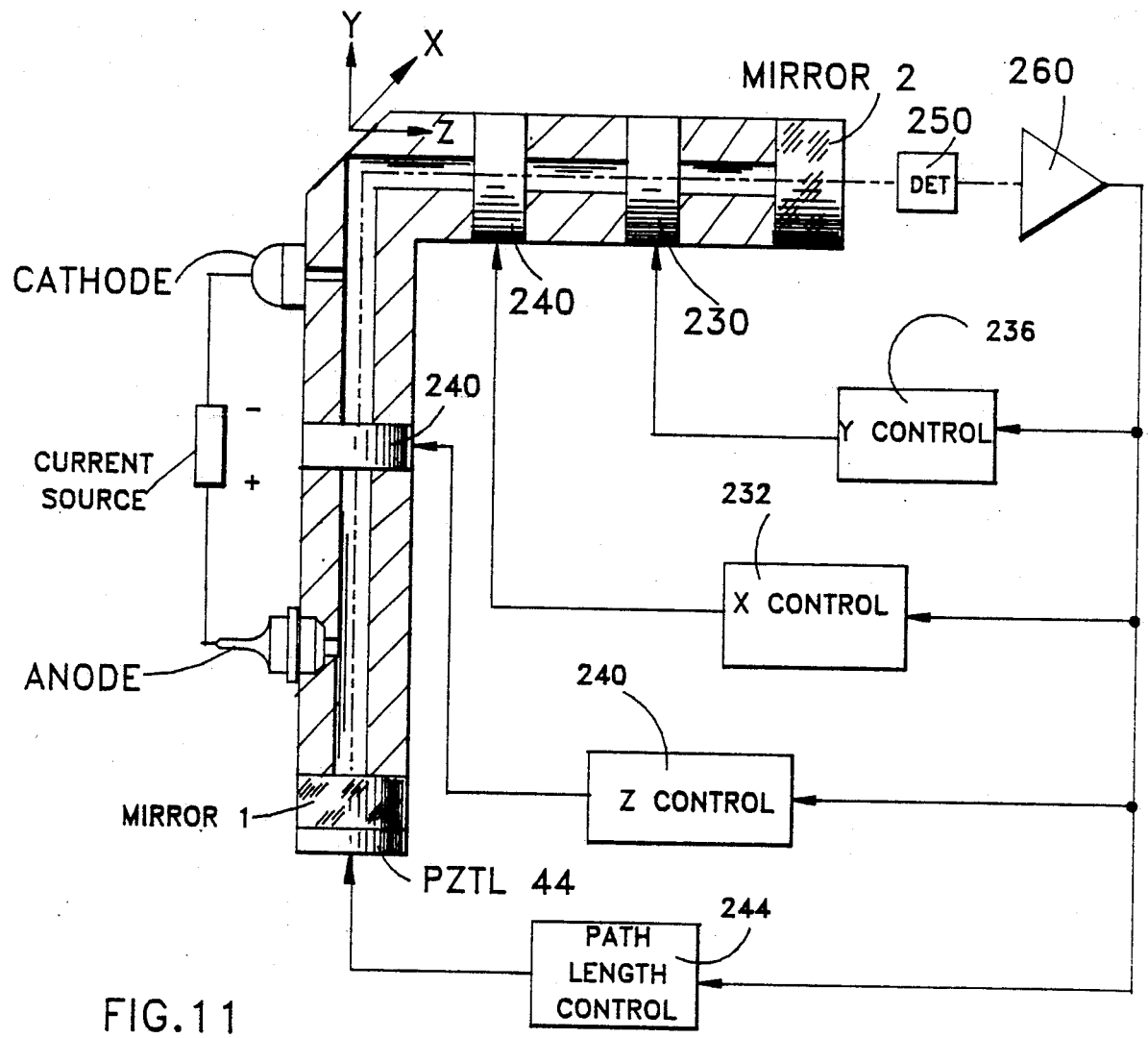
FIG. 11 is a sectional view of an "L" shaped laser accelerometer showing control loops for three axis sensing.

FIG. 11 is a schematic and sectional representation of the L-shaped laser accelerometer of FIG. 10. Regions 234, 230, and 240 represent the locations of subassemblies containing (x), (y), and (z) proof masses and their associated restoring coils and permanent magnets. Each of these subassemblies are driven by respective control loops represented by blocks 232, 236, and 240, respectively. Block 240 represents pathlength control electronics for adjusting the pathlength of the laser cavity by applying a control voltage to PZT1. Each of the respective blocks representing control electronics receive a detected signal from detector 250 via amplifier 260.

THEORY OF OPERATION

The device is basically a clear-path laser cavity containing acceleration-sensing element(s) which operates in a single longitudinal mode. The clear path feature arises from the fact that the lasing beam passes through the sensing element(s) in such a way that only diffraction loss occurs, but no transmission loss or significant optical electric field is produced inside a solid material internal to the cavity. Specifically, the effect of acceleration is to increase the aperture loss in the cavity and thus decrease the lasing output power. The incremental output power change is the means of picking off the effect of acceleration. The proposed mode of operation is to use a force-rebalance arrangement, where the drive to peak power output is a measure of the acceleration input.

The transverse electric field amplitude inside the cavity in cartesian coordinates for a general TEMmn mode operating in the cavity has the form $$E_{m,n} = E_o \frac{W_o}{W} H_m\left(\sqrt{2} \ \frac{x}{W}\right) H_n\left(\sqrt{2} \ \frac{y}{W}\right) \exp\left(-\frac{x^2 + y^2}{w^2}\right) \quad (1)$$

where
$E_o$ = field normalization constant
$H_m, H_n$ = Hermite polynomials of order m,n
W = the spot size (radius) of the beam for which the field has dropped to 1/e of its value at the center for the TEM$_{oo}$ mode $W_o$ = beam waist or minimum value of w inside the cavity (midway between the spherical end mirrors if they have the same radius)

The laser intensity is proportional to the square of the electric field amplitude given by Equation (1). For the TEM10 mode the laser intensity $I_{10}$ derived from (1) simplifies to $$I_{10} = A \left(\frac{w_o}{w}\right)^2 \left(\frac{x}{w}\right)^2 \exp\left[-2\left(\frac{x^2 + y^2}{w^2}\right)\right] \quad (2)$$

For the TEM11 mode the laser intensity $I_{11}$ simplifies to $$I_{11} = B \left(\frac{w_o}{w}\right)^2 \left(\frac{x}{w}\right)^2 \left(\frac{y}{w}\right)^2 \exp\left[-2\left(\frac{x^2 + y^2}{w^2}\right)\right] \quad (3)$$

where A and B in (2) and (3) are constants. Integration of either the (2) or (3) intensity profiles over the transverse plane yields internal laser power, which is contemplated to be in the few tenths of a watt range for a low power He-Ne laser. The amount of light transmitted by the output mirror and available for measurement by DET1 is expected to be in the many tens of microwatts region for such a laser.

FIG. 4 displays the intensity profiles of Equation (2) or (3) above corresponding to sections taken through 490 in FIG. 4a or through 480 in FIG. 4b. The distance between the two intensity lobe peaks is approximately 0.050 in. At equilibrium a sensor blanking surface 430 is centered about the central zero intensity point 420 of the operating mode. With a blanking surface width in the range of 0.001 to 0.002 in., the cavity loss introduced by the presence of the blanking surface in the equilibrium configuration is about 100 parts per million (ppm) out of a total cavity loss expected to be in the vicinity of many hundreds of ppm. With an acceleration input the center of the blanking surface is displaced with respect to the intensity profile zero point, thereby causing a substantial rise in cavity loss and a corresponding drop in detected output intensity. The drive required to restore the sensor to its equilibrium position and output power to its equilibrium value is a measure of the acceleration experienced.

The threshold value of sensor motion which is detectable in the invention accelerometer is estimated as follows. An output power change in the few nanowatt range is measurable using state-of-the-art detectors. For the fixed gain applicable in this case, this size of power change is attributable to a loss change of several thousandths of a ppm. The sensor translation necessary to produce several thousandths of a ppm loss change calculates out to be several microinches, or a small fraction of the 24.9 microinch operating wavelength of the He-Ne laser cavity. A sensor made from a glass-ceramic such as Zerodur with a flexure thickness of approximately 0.001 in. and having a mass with drive coils attached of about 3 grams is estimated to have a threshold acceleration measurement capability of better than 1 micro-g and a range extending to +/- 10 g's.

What is claimed is:

1. A laser accelerometer comprising:

an optical cavity characterizing a frame having an input axis (x), a cross axis (y) orthogonal to and co-planar with said input axis and a (z) axis passing through the intersection of said (x) and (y) axes, said (z) axis being orthogonal to the plane of said (x) and (y) axes;

an (x) axis proof mass having a predetermined blanking surface;

a flexible beam having a first end coupled to said (x) axis proof mass and a second end coupled to said frame, deflection of said flexible beams permitting a predetermined range of movement of said (x) proof mass on said input axis in a direction opposite to sensed acceleration of said frame;

a laser light source having a mirror means within said cavity for providing a light ray coaxially aligned with said (z) axis, said laser source being characterized to have a transverse electromagnetic field characteristic having a null intensity region centered on the (z) axis, said mirror means transmitting a light ray therethrough;

detector means having at least a first detector on a sensitive plane, said plane being normal to said (z) axis, said detector being positioned to be centered to said light ray and responsive to said transmitted light ray intensity signal;

bias and amplifier means coupled to said detector means for providing a bias current to said first detector and for amplifying said intensity signal, said intensity signal being characterized to have a magnitude related to the intensity of said transmitted light ray;

said (x) axis proof mass blanking surface being centrally positioned within and normal to said light ray null intensity region to provide increased blanking of said light ray in response to transverse movement of said mass on said input axis, said (x) axis proof mass deflecting said flexible beam and moving said blanking surface in a direction transverse to said light ray to partially blank said light ray in response to acceleration in the direction of said input axis (x);

control means responsive to said intensity signal for applying an (x) axis restoring force to restore said (x) axis proof mass to said central position and for providing an (x) axis output signal proportional to the restoring force.

2. The laser accelerometer of claim 1 further comprising:

a (y) axis proof mass having a predetermined blanking surface;

a flexible beam having a first end coupled to said (y) axis proof mass and a second end coupled to said frame, said deflection of said flexible beam permitting a predetermined range of movement of said (y) axis proof mass on said cross axis in a direction opposite to sensed acceleration of said frame;

said (y) axis proof mass blanking surface being centrally positioned within and normal to said light ray null intensity region to provide increased blanking of said light ray in response to transverse movement of said mass on said (y) input axis, said (y) axis proof mass deflecting said flexible beam and moving said blanking surface in a direction transverse to said light ray to partially blank said light beam in response to acceleration in the direction of said input axis (y);

control means responsive to said intensity signal for applying a restoring force to restore said (y) axis proof mass to said central position and for providing a (y) axis output signal proportional to the restoring force.

3. The laser accelerometer of claim 1 wherein said control means responsive to said intensity signal for applying a restoring force to restore said (x) axis proof mass to said central position and for providing a (x) axis output signal proportional to the restoring force further comprises:
a first oscillator operating at a first modulating frequency for providing a first oscillator signal;
an (x) axis lockin amplifier responsive to said first modulating signal and to said intensity signal for providing an (x) axis restoring signal; and
modulation means responsive to said (x) axis restoring signal and to said first oscillator signal for modulating said (x) axis restoring signal.

4. The laser accelerometer of claim 2 wherein said control means responsive to said intensity signal for applying a restoring force to restore said (y) axis proof mass to said central position and for providing a (y) axis output signal proportional to the restoring force further comprises:
a second oscillator operating at a second modulating frequency for providing a second oscillator signal;
a (y) axis lockin amplifier responsive to said second modulating signal and to said intensity signal for providing an (y) axis restoring signal; and
modulation means responsive to said (y) axis restoring signal and to said first oscillator signal for modulating said (y) axis restoring signal.

5. The laser accelerometer of claim 1 further comprising:
a first and second (z) axis proof mass, each said proof mass having a respective apertured blanking surface;
a flexible beam having a first end coupled to each said (z) axis proof mass and a second end coupled to said frame, said deflection of said flexible beam permitting a predetermined range of movement of said (z) axis proof mass on said (z) input axis in a direction opposite to sensed acceleration of said frame;
each said (z) axis proof mass apertured blanking surface being positioned to concentrically receive said light ray through said blanking surface apertures and normal to said light ray, said light ray passing through said aperture, said aperture being characterized to pass said light ray with minimum induced loss of laser efficiency, each said aperture being further characterized to provide increased blanking of said light ray in response to longitudinal movement of said mass on said (z) axis, each said (z) axis proof mass deflecting said flexible beam and moving said blanking surface in a direction coaxial with said light ray to partially blank said light beam in response to acceleration in the direction of said (z) axis;
control means responsive to said intensity signal for applying a restoring force to restore each said (z) axis proof mass to said minimum loss position and for providing a (z) axis output signal proportional to the restoring force.

6. The laser accelerometer of claim 5 wherein said control means responsive to said intensity signal for applying a restoring force to restore each said (z) axis proof mass to said minimum loss position and for providing a (z) axis output signal proportional to the restoring force further comprises:

a third oscillator operating at a third modulating frequency for providing a third oscillator signal;
a (z) axis lockin amplifier responsive to said third modulating signal and to said intensity signal for providing a (z) axis restoring signal; and
modulation means responsive to said (z) axis restoring signal and to said third oscillator signal for modulating said (z) axis restoring signal.

7. The laser accelerometer of claim 1 wherein said laser light source is further characterized to provide a light ray having a first segment coaxially aligned with said (z) axis and a second segment coaxially aligned with said (y) axis, said laser source being characterized to have a transverse field characteristic having a null intensity region centered on said (z) axis in first segment and said (y) axis in second segment;
a (z) axis proof mass having a predetermined blanking surface;
a flexible beam having a first end coupled to said (z) axis proof mass and a second end coupled to said frame, said deflection of said flexible beam permitting a predetermined range of movement of said (z) axis proof mass on said (z) input axis and transverse to said (y) axis in a direction opposite to sensed acceleration of said frame;
said (z) axis proof mass blanking surface being centrally positioned within and normal to said second segment light ray null intensity region to provide increased blanking of said second segment light ray in response to transverse movement of said mass on said (z) input axis.

8. The laser accelerometer of claim 7 wherein said control means responsive to said intensity signal for applying a restoring force to restore said (z) axis proof mass to said central position and for providing a (z) axis output signal proportional to the restoring force further comprises:
a third oscillator operating at a third modulating frequency for providing a third oscillator signal;
a (z) axis lockin amplifier responsive to said third modulating signal and to said intensity signal for providing a (z) axis restoring signal; and
modulation means responsive to said (z) axis restoring signal and to said first oscillator signal for modulating said (z) axis restoring signal.

9. The laser accelerometer of claim 1 wherein said laser light source further comprises a helium-neon laser light source operating in the TEM10 mode for a single-axis instrument.

10. The laser accelerometer of claim 1 wherein said laser light source further comprises:
an optical cavity; and
a control means responsive to said intensity signal for adjusting the path length of said optical cavity to peak the amplitude of intensity signal.

11. The laser accelerometer of claim 10, wherein said control means further comprises:
a fourth oscillator operating at a fourth modulating frequency;
a path length lockin amplifier responsive to said fourth modulating signal and to said intensity signal for providing a path length control signal; and
modulating means responsive to said path length control signal and to said fourth oscillator signal for modulating said path length control signal.

12. The laser accelerometer of claim 1 wherein said laser light source further comprises a helium-neon laser light source operating in the TEM11 mode for an instrument having at least two axes of sensitivity.

* * * * *